Sept. 26, 1967 L. J. CASHORE 3,343,410
APPARATUS FOR DETECTING CREEL CORD IRREGULARITIES
Filed March 18, 1965 7 Sheets-Sheet 1
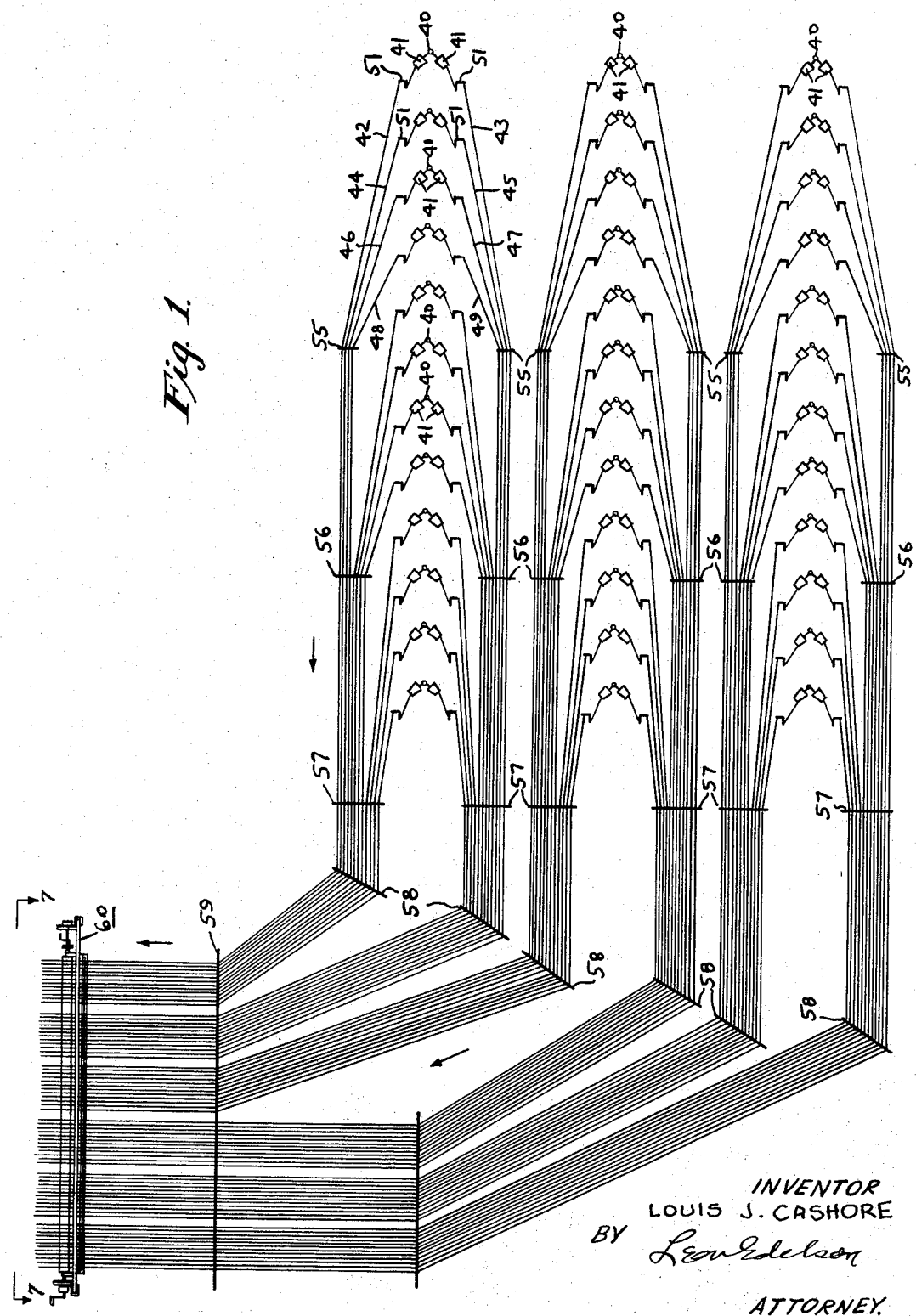
INVENTOR
LOUIS J. CASHORE
BY Leon Edelson
ATTORNEY.

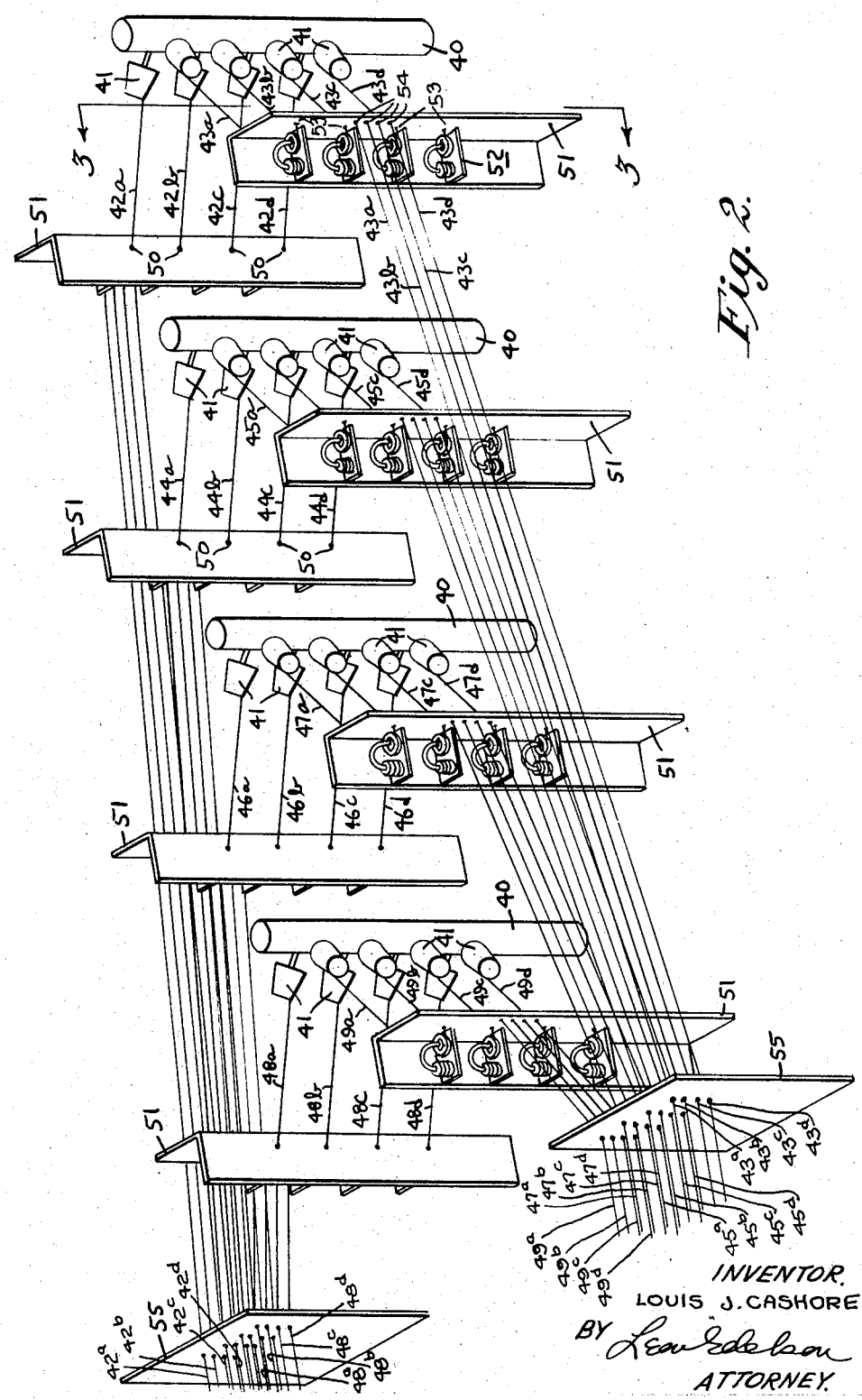

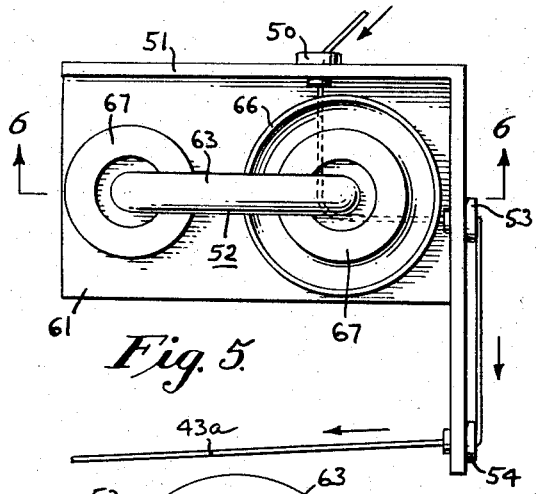
Fig. 5.
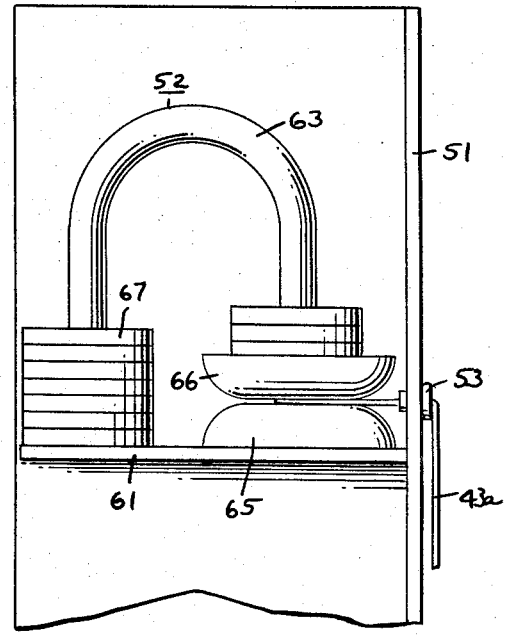
Fig. 4.
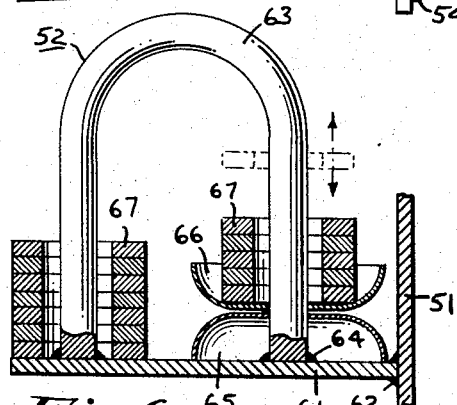
Fig. 6.
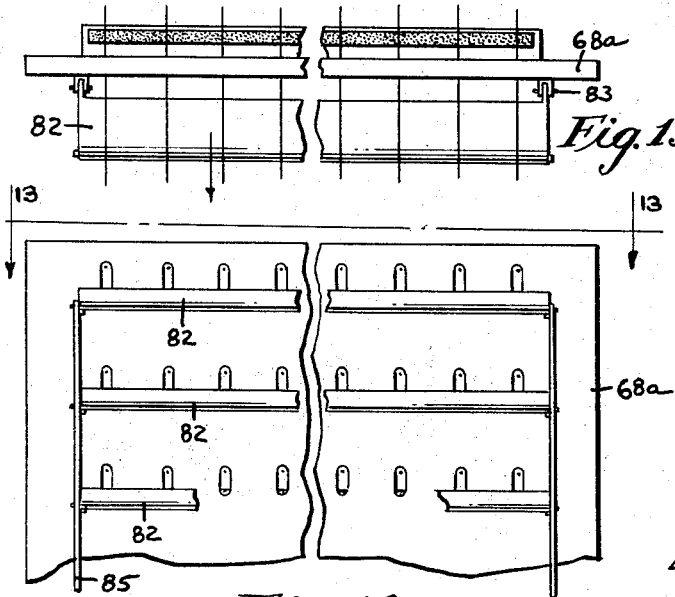
Fig. 13.
Fig. 12.
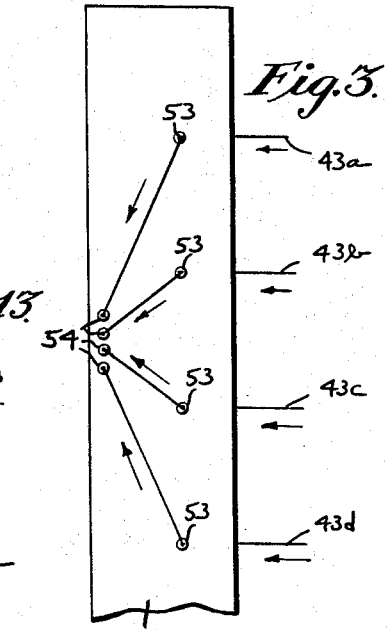
Fig. 3.
INVENTOR.
LOUIS J. CASHORE
BY
ATTORNEY.

Sept. 26, 1967  L. J. CASHORE  3,343,410
APPARATUS FOR DETECTING CREEL CORD IRREGULARITIES
Filed March 18, 1965  7 Sheets-Sheet 4

INVENTOR
LOUIS J. CASHORE
BY Lou Edelson
ATTORNEY.

Sept. 26, 1967  L. J. CASHORE  3,343,410
APPARATUS FOR DETECTING CREEL CORD IRREGULARITIES
Filed March 18, 1965  7 Sheets-Sheet 5

INVENTOR.
LOUIS J. CASHORE
BY
ATTORNEY.

Sept. 26, 1967  L. J. CASHORE  3,343,410
APPARATUS FOR DETECTING CREEL CORD IRREGULARITIES
Filed March 18, 1965  7 Sheets-Sheet 6
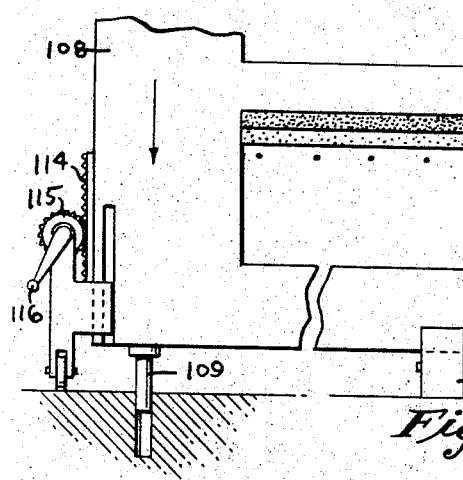
Fig. 26.
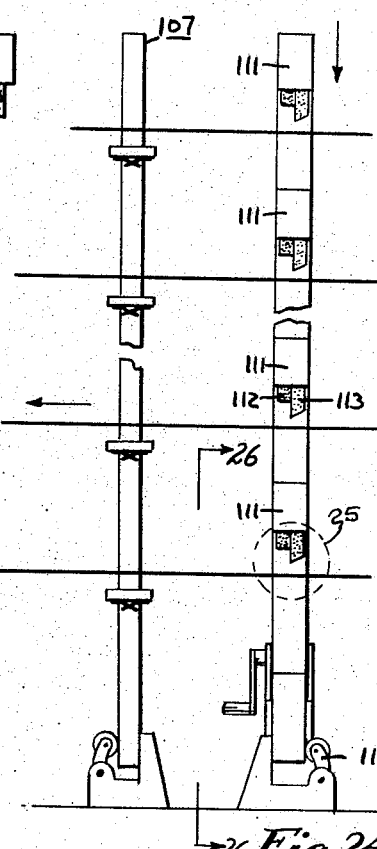
Fig. 24.
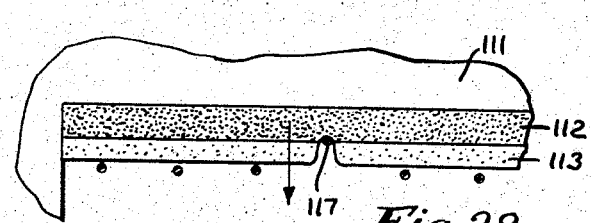
Fig. 27.
Fig. 28.
Fig. 29.
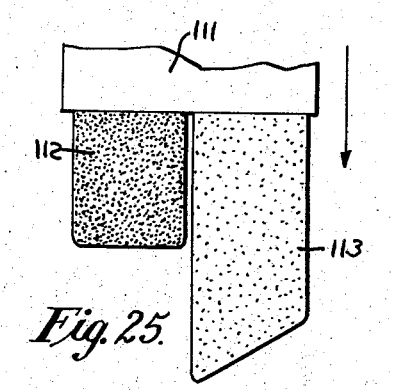
Fig. 25.
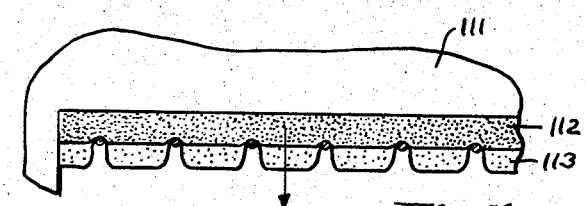
Fig. 30.
INVENTOR.
LOUIS J. CASHORE
BY Lew Edelson
ATTORNEY.

Sept. 26, 1967  L. J. CASHORE  3,343,410
APPARATUS FOR DETECTING CREEL CORD IRREGULARITIES
Filed March 18, 1965  7 Sheets-Sheet 7

INVENTOR.
LOUIS J. CASHORE
BY Lew Edelson
ATTORNEY.

United States Patent Office 3,343,410
Patented Sept. 26, 1967

3,343,410
APPARATUS FOR DETECTING CREEL CORD IRREGULARITIES
Louis J. Cashore, 113 E. 7th Ave., Conshohocken, Pa. 19428
Filed Mar. 18, 1965, Ser. No. 440,822
21 Claims. (Cl. 73—160)

ABSTRACT OF THE DISCLOSURE

A system for marking the cords delivered from individual supply reels therefor to and through a creel apparatus by which the cords are arranged in planar arrays, the marking of the cords being for the purpose of detecting and identifying those cords which may have become broken or which may be excessively or insufficiently tensioned. The creel apparatus is provided with a cord-marking medium transversely spanning each planar array of the cords in non-contacting spaced relation thereto and yieldable deflector means which variably deflect the several cords of an array toward and into contact with the marking medium in accordance with the degree of tension possessed by each cord as it travels through the creel. As the cords engage the marking medium they are stained at different points along their lengths depending upon differences in tension of the cords at the marking station and thus the marked cords are self-indicating of variations in tension with respect to a predetermined norm.

---

This invention relates generally to apparatus for detecting and correcting irregularities in a cord delivery system, such as a creel apparatus, and more particularly, provides means for quickly detecting the presence of sag or breakage of each of the individual cords which are being drawn through the creel structure. The system according to the present invention utilizes devices for staining the cords running through the creel structure at one or more selected points therein, the stain being selectively applied to the cords which due to breakage or loss of tension resulting in sag thereof are displaced from a predeterminedly desired common plane of travel. Means are also provided for making a printed record of the stained cords so that the positions in the creel of those cords in an undesirable condition can be quickly ascertained.

Creels are used for many purposes, as for example in the winding of a multiplicity of separate threads or cords into individual packages, in textile machinery utilized for winding, twisting, weaving, knitting and warping, or in the production of cord reinforced sheets and fabrics made of synthetic and resilient material such as rubber. Cord reinforced rubber fabrics are frequently used in the manufacture of devices subjected in use to severe mechanical strain such as power transmission belts, conveyor belts and rubber tires. The reliability and freedom from failure of these devices is greatly dependent upon the strain resistance capabilities of the cord reinforced rubber fabric utilized in the manufacture thereof. Uniformity of quality is therefore important in these materials and it is dependent to an important degree upon the uniform distribution and lay of the cords and the tension thereof in the fabric of which they form a part and the continuity or absence of breaks in the cords.

Cord reinforced fabrics are generally made in a continuous flow type of process in which hundreds of separate cords are drawn from individual supply reels from which they pass into a creel device which integrates these separate cords into horizontally and vertically spaced parallel arrays which ultimately may be several feet in overall width and height, and in which the cords are moving longitudinally at relatively high speed. With several hundred cords being drawn through the creel at high speed it is not always possible to detect breakage of an individual cord in a planar array of the cords or sag of any given cord out of its proper plane, both of these conditions resulting from improper tension of the cord at some preceding point in the creel mechanism. A sagging cord or the absence of a cord due to a break will obviously result in weak sections in the finished cord reinforced fabric which will render the finished product in which the fabric is used subject to failure either prematurely or under operating conditions normally well within the capabilities thereof. Accordingly, it is a primary object of my invention to provide a novel apparatus for detecting slack or broken cords which are being drawn through a creel mechanism so that the conditions resulting in such slack or broken cord may be quickly remedied to restore uniformity of the cord array.

Another object of my invention is to provide a novel apparatus for detecting and identifying not only broken cords but also those having excessive or insufficient tension within an array of cords moving at relatively high speed by, in one case, selectively staining all cords displaced from a predeterminedly established common plane desired for a cord array due to sag resulting from insufficient tension in or breakage of a particular cord, and, in another case, detecting and identifying over-tensioned cords before breaking thereof occurs so that the over-tension condition may be corrected to prevent cord breakage.

Still another object of my invention is to provide novel cord tensioning apparatus superior to presently used devices and by means of which a relatively fine control can be exercised over the tension of any given cord in the array.

Yet another object of my invention is to provide novel apparatus for detecting slack, over-tight or broken cords as aforesaid which also provides a printed record of the tension conditions of cords in the cord array relative to one another.

A further object of my invention is to provide novel apparatus as aforesaid operative to detect the undesired cord tension conditions regardless of whether the cords in the array are moving horizontally, vertically or at some intermediate inclination.

The foregoing and other objects of my invention will become clear from a reading of the following specification in conjunction with an examination of the appended drawings, wherein:

FIGURE 1 illustrates in plan diagrammatic form an overall system for taking threads or cords from separate spools and combining the same into a plurality of vertically spaced, generally horizontally extending arrays of closely spaced parallel cords, and apparatus according to the invention for detecting slack and broken cords;

FIGURE 2 is an enlarged perspective view of one section of the creel structure of FIGURE 1 illustrating the spool standards, angle posts and tensioning devices, and the combination of the various cords into a creel thread board;

FIGURE 3 is an enlarged elevational view of the rear surface of the creel system angle posts as would be seen when viewed along the line 3—3 of FIGURE 2;

FIGURE 4 is an enlarged side elevational view of the novel cord tensioning device according to the invention as seen on a smaller scale in the showing of FIGURE 2;

FIGURE 5 is a plan view of the tensioning device illustrated in elevation in FIGURE 4;

FIGURE 6 is a vertical sectional view through the novel thread tensioner as would be seen when viewed along line 6—6 of FIGURE 5;

FIGURE 12 is a front elevational view of the modified device of FIGURE 11 as would be seen when viewed along the line 12—12 of FIGURE 11;

FIGURE 13 is a top plan view of the modified form of apparatus shown in FIGURES 11 and 12, as would be seen when viewed along the line 13—13 of FIGURE 12;

FIGURE 24 illustrates in side elevation another form of marking device operative for top marking of the cords in the array;

FIGURE 25 is an enlarged detailed view of the marking portion of the device of FIGURE 24 which is enclosed in the phantom circle designated 25;

FIGURE 26 is a fragmentary front view of the marking apparatus of FIGURE 24 as would be seen when viewed along the line 26—26 thereof;

FIGURES 27 through 30 are similar to FIGURES 16 through 19 in that they illustrate the marking of cords in the array which are characterized by differing degrees of tautness;

Figures 32, 33:
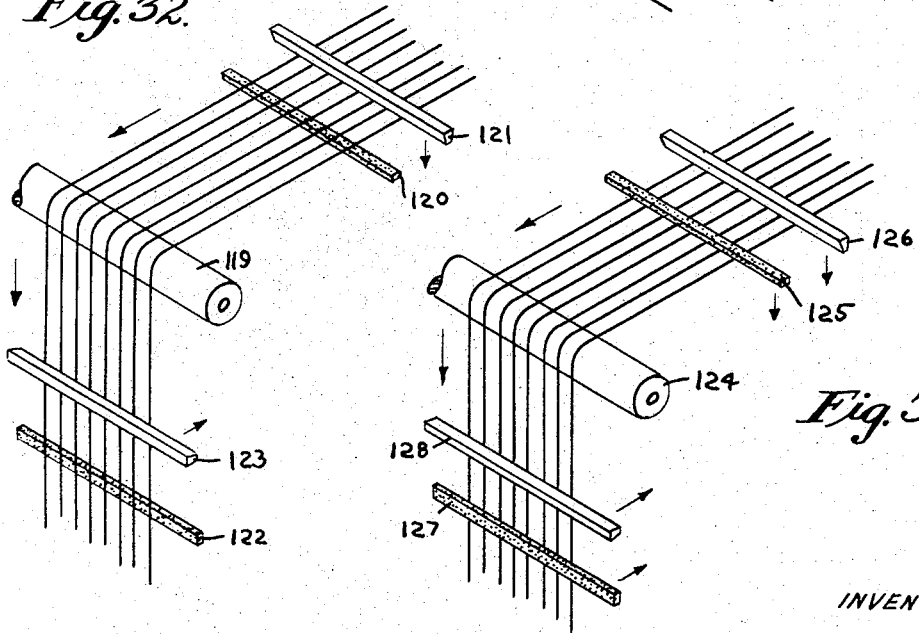

FIGURE 32 illustrates diagrammatically the manner in which the various embodiments according to the invention are enabled to mark loose cords before marking tight cords independently of the direction of travel of the cords in the array; and FIGURE 33 illustrates diagrammatically the manner in which the embodiments of the invention are effective to mark tight cords in the array before marking loose cords independently of the direction of travel of the cords in the array.

In the several figures, like elements are denoted by like reference characters.

Turning now to the figures, and referring first to the showings of FIGURES 1 and 2, there is observed at the right hand end of FIGURE 1, and on enlarged scale in FIGURE 2, a plurality of spool standards 40 upon which are vertically mounted a plurality of cord or thread spools 41. The spools 41 each have led off therefrom its individual cord designated for the right hand end section as the individual cord groups 42 through 49 with each such cord group containing four vertically spaced individual cords designated as a, b, c and d within the numbered group. Each cord, as best seen from FIGURES 2 through 5, passes through an associated porcelain eyelet 50 fitted through the side leg of angle posts 51, passes through a cord tensioning device designated generally as 52, passes backward through a porcelain eyelet 53 in the rear leg of the angle posts 51 and then forward through another eyelet 54. The cord tensioning devices 52 are carried by the angle posts 51 at vertically spaced levels corresponding to the associated cord spool 41, and as best seen in FIGURES 2 and 3 the eyelets 54 are vertically converged so that the cord group emerging therethrough and moving forward therefrom is disposed in a small vertical interval as compared to the original vertical spacing between the cords of the group. This is most clearly seen from the cord group 43 in FIGURE 2.

The tensioned and vertically converged cord groups 42, 44, 46 and 48 extend forward and are combined into a rectangular array of horizontally and vertically spaced rows of cords by being passed through eyelets in the thread board 55, each cord group being vertically disposed and spaced horizontally from the next adjacent cord group with all of the cords designated by the same letter being in a common horizontal plane and with all of the horizontal cord planes being disposed in uniformly spaced and parallel relation. Thus, the cords 42a, 44a, 46a and 48a are all disposed in a common horizontal plane after being combined in the thread board 55, and similarly for the below lying planes of "b" cords, "c" cords and "d" cords. This same combination of cords is effected for the cord groups 43, 45, 47 and 49. While in the arrangement illustrated in FIGURES 1 and 2, the initial array traversing the thread board 55 comprises four horizontally spaced and an equal number of vertically spaced rows of cords, it will be understood, of course, that the array may consist of a plurality of cords arranged in horizontally and vertically spaced rows other than the four by four arrangement shown.

As best seen in FIGURE 1, the cord arrays passing through each of the thread boards 55 respectively extend forwardly therefrom to and through a larger thread board 56 where an additional cord array is combined therewith from a second group of spools which are arranged in exactly the same manner as those described in detail in connection with the showing of FIGURE 2. The enlarged cord arrays passing through the thread boards 56 respectively extend forward for combination with yet another set of cord groups of thread boards 57 and so on to form still larger consolidated cord arrays which then move forward through guiding thread boards 58 and on to a combining thread board 59 where all of the individual cords are combined into one single rectangular array of cords consisting of a predeterminedly desired number of vertically and horizontally spaced rows thereof. The consolidated cord array extends forward through a cord tension detecting device indicated generally as 60 and which will be described in connection with the showing of FIGURES 7 through 10. However, attention should first be directed to FIGURES 4 through 6 which illustrate the structural features of the novel cord tensioning device previously described and designated as 52.

Each of the tensioning devices 52 includes a flat base 61 welded, as at 62, or otherwise secured within the angle of a post 51. Each post is provided with a plurality of these vertically spaced tensioning devices, one such device being provided for each of the several cords which traverse the post in the course of their run from their supply spools toward a thread board, such as the board 50 of FIGURE 2. Extending above the base 61 is an inverted U-shaped member 63 having its lower terminal ends welded, as at 64, to the upper surface of the base 61 to fixedly secure the member in position. Closely embracing the innermost one of the vertical legs of the member 63 and seated upon the base 61 is an inverted dish-shaped cord-engaging plate 65 having a substantially flat central top surface the marginal portion of which is rounded to smoothly merge into the circumferential wall of the plate. Seated upon the fixed plate 65 is an upper dish-shaped cord-engaging plate 66 of the same form as the fixed lower plate 65 but with the hollow or dished upper surface thereof facing upward so that its smooth bottom surface may seat downward upon the cord to be tensioned. The upper plate 66 is centrally apertured to permit it to move freely on its supporting leg of the member 63 relatively to the bottom plate 65 and thereby coact with the latter to frictionally engage the cord which moves between the plates 65 and 66. Held captive on the U-shaped member 63 are a plurality of centrally apertured metal washer-like weight units 67 which may be shifted from one leg of the member to the other so that any desired number of such units may be added to or removed from the upwardly presenting plate 66 to thereby incrementally adjust the tensioning pressure exerted on the cord by the combined weight of the plate 66 and the weight units 67 pressing against the inverted fixed bottom plate 65. Any desired weight increment may be adopted, a few grams per unit having been found to be satisfactory.

Consider now FIGURES 7 through 10 which illustrate one form of tension detecting device according to the invention, and specifically the form of device designated in FIGURE 1 generally as 60. As shown in FIGURE 1 the detecting device of whatever form is desirably located between any two creel thread boards which insure parallel relationship, both vertically and horizontally, of all of the cords in the section to be observed. It should be understood that the tension detecting devices to be described are not limited in applicability to locations within the creel where all of the cords have been combined into a final array, as shown in FIGURE 1, but may in fact, for example, be disposed between thread boards 57 and 58 of a given array. Thus, the tension detecting device of the present invention may be provided for each one of the several smaller arrays which ultimately are combined into the total array, or it may be designed and located for use in the creel at a point therein wherein a number of arrays have been combined into one larger array, such as that passing through the device 60 located as shown in FIGURE 1. Bearing the foregoing in mind, FIGURES 7 through 10 will be described in connection with cords of the previously numbered groups for ease of consideration.

Figure 10:
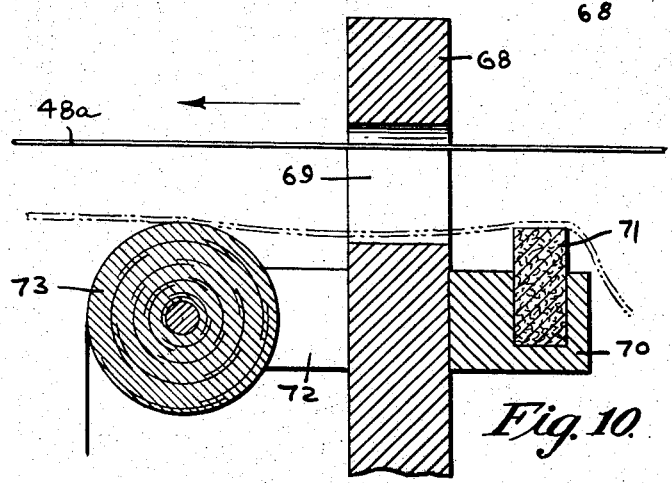
FIGURE 10 is an enlarged fragmentary vertical sectional view through the cord staining and detecting devices of the structure of FIGURE 7 as would be seen when viewed along the line 10—10 thereof.

Considering now FIGURES 7 through 10, the tension detecting device comprises a vertically oriented planar board 68 provided with horizontal rows and vertical columns of vertically elongated apertures 69 through each of which passes one cord of the array as indicated. Secured to the rear surface of the board 68 and extending horizontally immediately beneath each row of apertures is a shelf 70 which carries an ink pad 71, the upper surface of the ink pad 71 being just above the bottom of each aperture 69 in the row. Secured to and extending forward from the front face of the board 68 are a plurality of brackets 72 which carry rolls of paper 73 disposed horizontally and extending beneath each row of cords with the paper surface slightly above the bottom of the elongated apertures 69. As best seen in FIGURE 10, should a cord break as shown by the phantom cord outline, the cord sags downward and falls upon the ink pad 71 while being drawn through the creel structure. Consequently, the stain or ink picked up by the broken cord from the ink pad 71 is transferred to the surface of the paper roll 73 to indicate the location of the broken cord.

Figure 7:
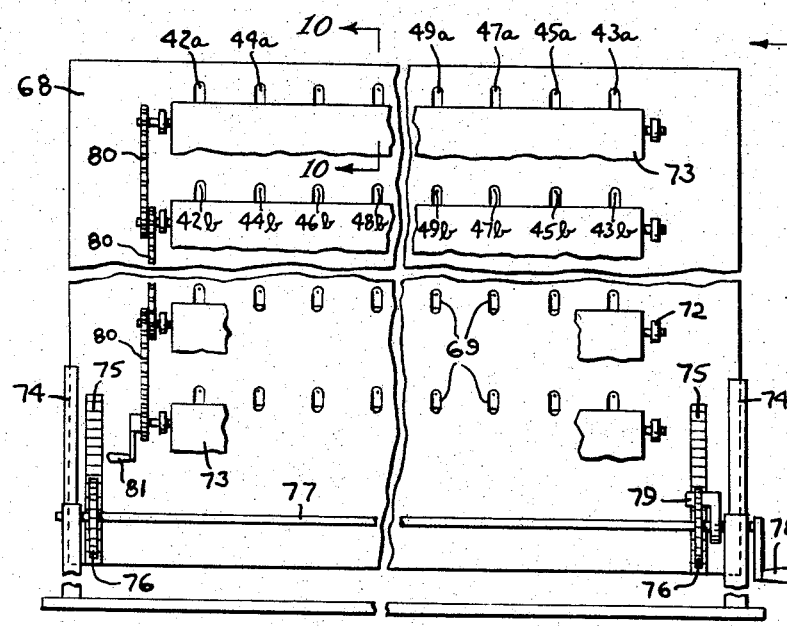
FIGURE 7 is a front elevational view, enlarged and fragmented, of one form of cord staining and detecting apparatus according to the invention as would be seen when viewed along the line 7—7 of FIGURE 1.
Figure 8:
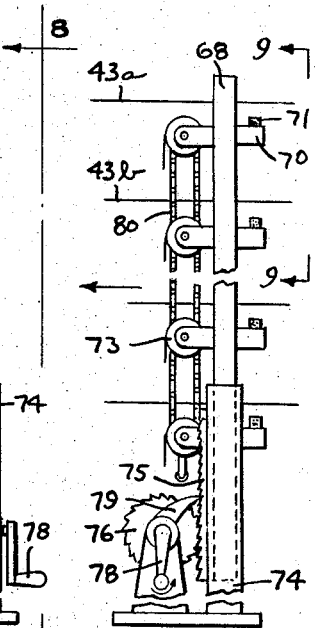
FIGURE 8 is an end view of the apparatus of FIGURE 7 as would be seen when viewed along the line 8—8 of FIGURE 7.
Figure 9:
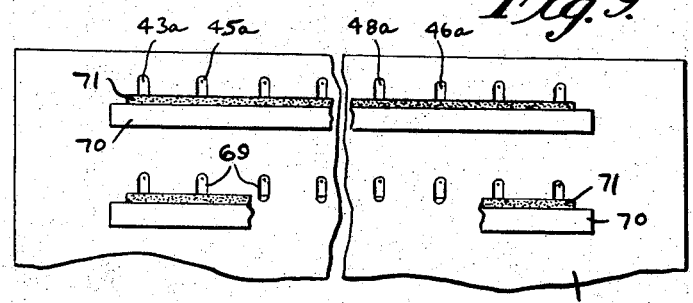
FIGURE 9 is a rear view fragmentary showing of the apparatus of FIGURE 7 as would be seen when viewed along the line 9—9 of FIGURE 8.

Under-tensioned cords can be detected by this apparatus prior to breakage thereof by utilizing the vertical shiftability of the board 68 to be now described. As best seen in FIGURES 7 and 8, the board 68 is mounted in a pair of vertically extending opposite side channels 74 which function as guides for the board 68. Secured to the front face of the board 68 at opposite sides are racks 75 each of which is engaged with the teeth of an associated ratchet wheel 76 commonly mounted on a transversely extending shaft 77 which is rotatable by a handle crank 78. A pawl or dog 79 permits rotation of the ratchet wheels 76 to drive the board 68 vertically upward but prevents downward movement of the board 68 by engagement of the dog with the teeth of rack 75. Consequently, the board 68 may be elevated one rack tooth at a time as desired to pick up creel cords of different degrees of looseness. Thus, cords which have sagged for example to positions fairly close to the bottom of the apertures 69 will first encounter the ink pads 71 and make their marks upon the paper rolls 73, and as the board 68 is then raised further, it will detect somewhat tighter cords at somewhat higher elevations until eventually all of the cords will be picked up as the board 68 carries the ink pads 71 upward to the plane of proper cord tension. The paper rolls 73 may be all rotated by the chains 80 driven by crank 81 as best seen in FIGURE 7, so that the marked portion of the paper surface is rendered visible from the floor to disclose to inspection personnel the state of tension in the various cords of the creel.

Figure 11:
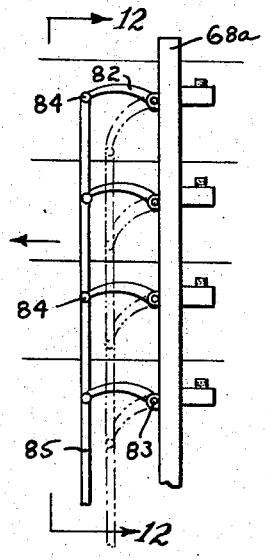
FIGURE 11 shows a modified form of the staining and detecting apparatus shown in FIGURES 7 through 10 which utilizes a different form of stained cord detecting device.

FIGURES 11, 12 and 13 illustrate a modification of the structure of FIGURES 7 through 10 in that the paper rolls 73 are replaced by a plurality of convex-up cord tension recording plates 82 pivotally secured as at 83 to the front face of the vertical planar board 68a and extending forward therefrom. The front edges of the recording plates 82 are pivotally secured as at 84 to a vertically extending common tie bar 85. With the tension recording plates 82 in the position shown in solid line in FIGURES 11, 12 and 13, the board 68a is vertically shiftable to mark the cords of the array in the same manner as previously described for the embodiment of FIGURES 7 through 10. When the recording phase has been completed, the tie bar 85 may be drawn downward to turn the upper faces of the recording plates downward so they assume the position illustrated in phantom showing in FIGURE 11 with their upper recording surfaces visible to inspection personnel from the floor.

Consider now FIGURES 14 through 23 which illustrate another form of the invention of a more versatile nature which makes it possible to detect over-tensioned cords as well as slack cords by providing the ability to mark the cords in the creel selectively on the basis of first marking the tightest cords or in the alternative first marking the loosest cords. From FIGURES 14, 20 and 21 there is seen a marking board 86 having elongated apertures 87 through which pass the cords of the array in exactly the same manner as has been already described for the vertical board 68 of FIGURE 10. The board 86 is held between a pair of opposite side channel guides 88 and is vertically shiftable therewithin by means of the operating lever 89.

Figure 20:
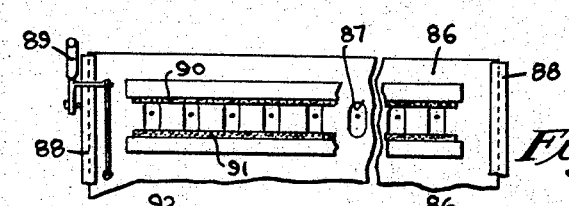
FIGURE 20 is a fragmentary front elevational view of the marking means portion of the apparatus of FIGURE 14 as would be seen when viewed along the line 20—20 thereof.
Figure 21:
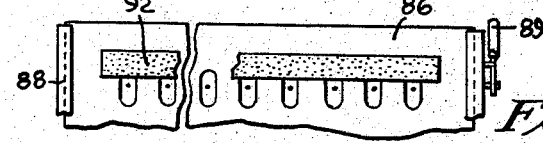
FIGURE 21 is a view similar to that of FIGURE 20 but taken from the rear side of the marking device.

Secured on the front face of the board 86 are horizontally extending top and bottom ink pads 90 and 91 respectively, these ink pads 90 and 91 being positioned respectively below the upper edge of apertures 87 and above the lower edge thereof, as is perhaps best seen from the showing of FIGURE 20. In order to determine whether an upper or a lower ink pad has caused particular cords to be stained, all of the bottom ink pads may be supplied with an ink or stain of one color while all of the top ink pads may be supplied with ink or stain of a different color. Fixedly secured to the rear surface of the board 86 and extending across the upper ends of apertures 87 are resiliently deformable depressors 92 formed of foam rubber or other such more or less readily compressible material. These depressors 92 are each disposed with its lower edge extending across each horizontal row of apertures 87 along a line spaced just below the inking surface of the upper ink pad 90 associated with said row of apertures.

Figure 14:
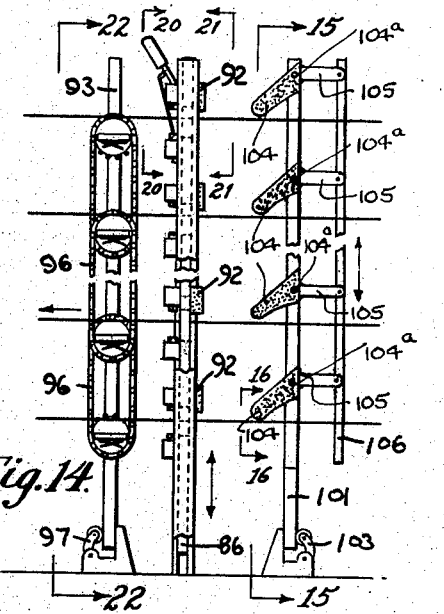
FIGURE 14 illustrates a side elevational view of a different embodiment of the invention utilizing three separate structures to provide cord array deflection, cord marking and marked cord recording means.
Figure 22:
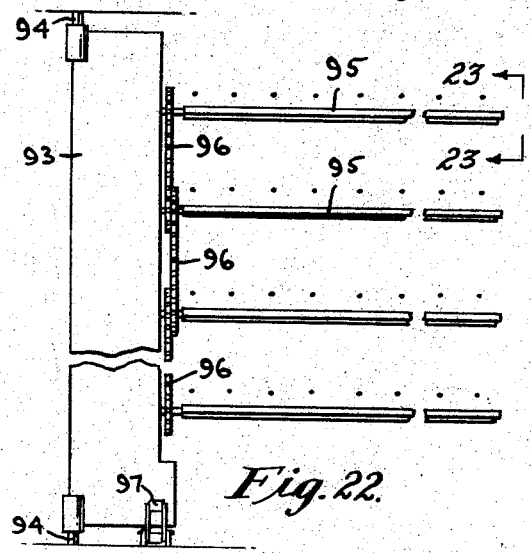
FIGURE 22 is a front elevational view of the recording portion of the apparatus of FIGURE 14 as would be seen when viewed along the line 22—22 thereof.
Figure 23:
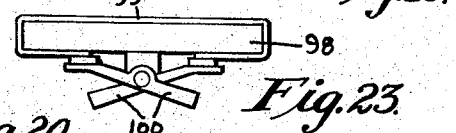
FIGURE 23 is an end elevational view on an enlarged scale of one of the recording plates as would be seen when viewed along the line 23—23 of FIGURE 22.

The stained cords recording structure as shown in FIGURES 14 and 22 includes a vertically extending side support frame 93 pivoted at top and bottom as at 94 along its outer edge for swinging movement about a vertical axis, the frame 93 carrying a plurality of vertically spaced horizontally extending recording devices 95, each positioned as best seen in FIGURE 22 to underlie one horizontal row of cords of the creel assembly. The devices 95 are carried by shafts having gears affixed thereto at the frame ends and encircled by drive chains 96 so that the recording devices 95 may be rotated on their shafts to provide a view from the floor of the upper surfaces of the devices after recording has been carried out. The entire recording structure is swingable into and out of the creel array by virtue of the pivotal support of frame 93, the frame and recording devices being held in operative recording position by the snap latch device 97 which catches the inside lower end of the side support frame 93. As best seen in FIGURE 23, each of the recording devices 95 includes a generally rectangular platen 98 about which is wrapped a replaceable recording paper 99, which latter is held in position on the platen by any suitable means, such as spring-loaded clamp arms 100 as shown in FIGURES 14 and 23.

Figure 15:
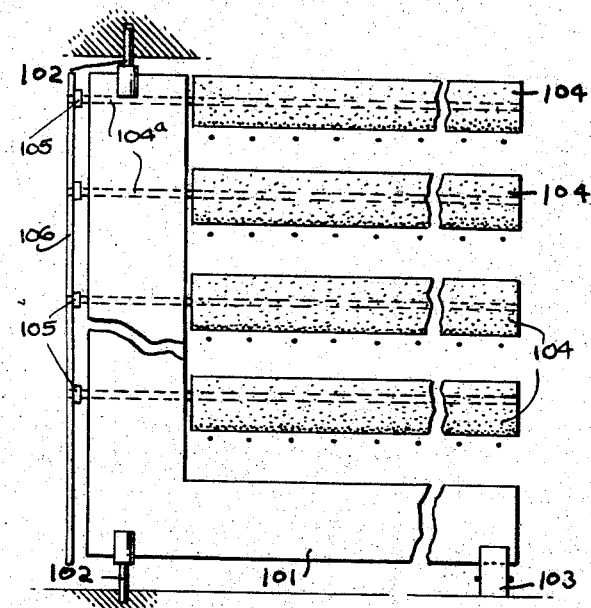
FIGURE 15 is a front elevational view of the deflector unit as would be seen when viewed along line 15—15 of FIGURE 14.

Referring now to FIGURES 14 and 15 there is seen disposed to the rear of the marking board 86 an assembly which is generally similar in configuration to the recording structure in that it includes a frame 101 having top and bottom pivots 102 to provide for swing motion of the frame about a vertical axis and a snap latch 103 for locking the frame in operative position for use. However, in lieu of the oscillatable recording devices 95 of the recording structure above described, the assembly just referred to includes a plurality of horizontally extending resilient depressor arm 104 fixed upon horizontally extending oscillatable shafts 104a carried by the frame 101 with the depressor arms each positioned immediately above one horizontally extending row of creel cords. Each of these depressor arms 104 is suitably formed of foam rubber or other suitable compressible material similar to that constituting the depressors 92 fixed upon the apertured thread board.

The shaft upon which each depressor arm is mounted extends through the frame 101 and is fixedly secured to one end of a crank arm 105, the other end of such crank arms being pivotally connected to a vertically extending common actuating rod 106. Thus, when the actuating rod 106 is shifted upward, the resilient depressor arms 104 are rotated downward into engagement with the underlying row of creel cords and depress the cords in accordance with the degree of tension in each cord and the extent to which the arms are rotated. The action of depressors 92 and 104 is basically the same and is most clearly understood from the illustration of FIGURES 16 through 19, to which attention should be now directed.

Figure 16:
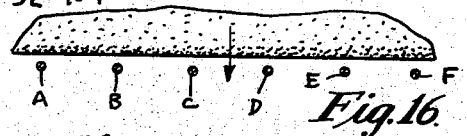
FIGURE 16 is a fragmentary front view of one of the deflector blades as would be seen when viewed along the line 16—16 in FIGURE 14.
Figure 17:
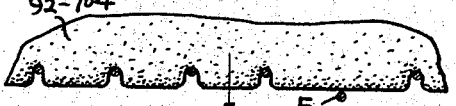
FIGURES 17 through 19 are similar to FIGURE 16 but show the deflector blade in engagement with the cord array under different conditions of tautness of the various cords in the groups.

In FIGURES 16 through 19 the resiliently deformable depressor has been designated as 92–104 to indicate that this may represent either one of the depressors 92 on the board 86 or one of the depressor arms 104 of the structure shown in FIGURES 14 and 15. The depressors are illustrated in conjuncton with a single plane horizontal array of six cords designated from left to right by the letters A through F. In FIGURE 16 all of the cords are shown to be in a common plane, i.e., at about the same elevation, to indicate that while the cord tensions may vary from one cord to another, there are no very loose or sagging cords in the group. FIGURE 17 shows the depressor moved downward into engagement with the same horizontal array of cords to illustrate a condition wherein cord E, which is somewhat looser than the other cords of the array, is deflected downwardly below its original position shown in FIGURE 16, without, however, effecting any corresponding deflection of the remaining cords of the array.

Figure 18:
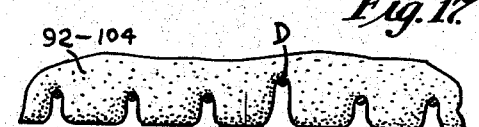
Figure 19:
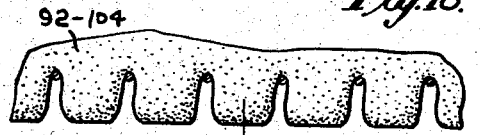

FIGURE 18 illustrates a condition just the reverse of that illustrated in FIGURE 17, namely, one wherein all but the single more tightly tensioned cord D are depressed below the plane of the latter. In this latter instance, it will be noted that the depressed cords are somewhat more greatly tensioned than was the cord E of FIGURE 17, as is indicated by the greater deformation of the deflector in engagement therewith. FIGURE 19 illustrates the condition of uniform tension throughout the cords of the group since even after engagement by the depressor, they all remain substantially in plane.

Assuming that the depressor is the depressor 92 carried by the board 86, the illustration of FIGURE 17 would result in staining, by means of the upper ink pad 90, of all of the cords of the group excepting cord E, since the latter is moved away from the upper ink pad 90 as the board 86 moves downward. The showing of FIGURE 18 would result in the staining of cord D by upper ink pad 90 before staining of any of the other cords of the group, while the showing of FIGURE 19 is that wherein all cords of the some horizontal array would be simultaneously marked by the ink pad 90 to indicate that they were all of the same tension.

The reverse conditions would obtain if the deflection is caused by depressors 104, cord E of FIGURE 17 being first stained by deflection downward into engagement with bottom ink pad 91, and cord D of FIGURE 18 being the last to be stained by engagement with bottom ink pad 91. Consequently, it will be now appreciated that slack cords and over-tight cords may both be detected so that adjustments in the cord tension may be made to restore uniformity.

Consider now FIGURES 24 through 30 which illustrate a further embodiment of the invention wherein the recording structure designated generally as 107 is substantially similar to that already described in connection with the showings of FIGURES 14 and 22 and need not be further described. The marking structure is somewhat different from that shown in FIGURE 14 in that it is not a board provided with elongated apertures, but is instead a frame type device having a side support portion 108 fitted with top and bottom pivotal supports 109 to permit the frame to rotate about a vertical axis, and a snap latch 110 to detent the frame in its operative position. Extending horizontally laterally from the vertical frame portion 108 are a plurality of arms 111 secured to the underside of which and projecting downwardly therefrom are an ink pad 112 and resiliently deformable depressor 113. The depressor 113 extends downward further than the ink pad 112 and is positioned rearward of the ink pad so that a creel cord which may engage both engages the depressor prior to the ink pad. The entire structure is vertically shiftable by means of the rack 114 and pinion 115 engaged therewith, the rack being secured onto the side edge of frame 108 and the pinion being operable by crank 116.

Lowering of the frame 108 by means of the rack and pinion causes each arm 111 to move downward and carry toward the below lying cord array the depressor and ink pad secured to the undersurface of each arm. This results in sequential marking of the cords with the tightest cord being marked first and the loosest cord being marked last. Marking of a tight cord is illustrated in the showing of FIGURE 28 wherein all cords except one have been moved downward by the depressor 113 with the very tight lone exception 117 deforming the depressor and engaging the ink pad 112 to be thereby first marked. FIGURE 29 illustrates the condition where all cords in the array except one are of uniform tension while the remaining cord 118 is somewhat slack and capable of being depressed by depressor 113. Consequently, all cords except the slack one remain in plane and are marked substantially at the same time by ink pad 112 while the slack cord has been moved downward away from the ink pad. FIGURE 30 illustrates the condition of complete uniformity of cord tension so that all of the cords depress the same amount and finally engage the ink pad 112 at substantially the same time. Recording takes place of course as has been previously described in detail.

Figure 31:
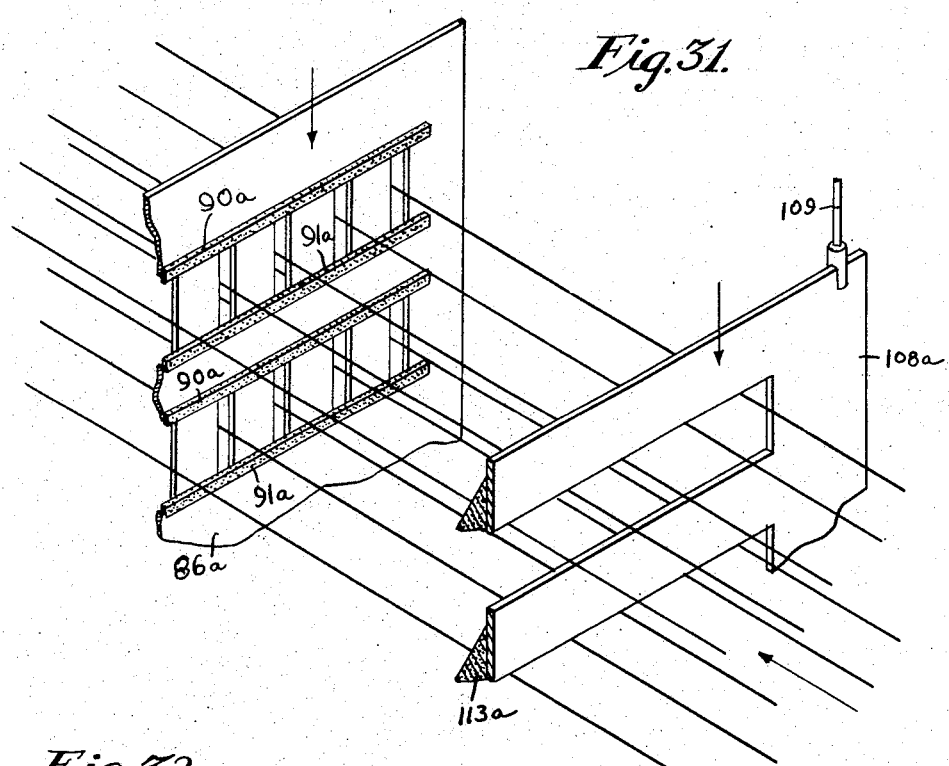
FIGURES 31 illustrates yet another embodiment of the invention adapted to mark the cords of the array either from above or from below.

FIGURE 31 shows representationally another modification of previously described apparatus effective for marking the cords of a creel array, the marking and deflecting devices only being illustrated. The marking board is designated as 86a since it is very similar to the board 86 shown in FIGURES 14 and 20, differing therefrom only in that the resiliently deformable depressors 92 have no equivalent in the structure of FIGURE 31. The marking board 86a is shiftable vertically downward to cause marking of the creel cords by the top ink pads 90a, while the deflector device 108a is downwardly shiftable to move the creel cords against the bottom ink pads 91a. The deflector is substantially the same structurally as the combination deflector and marker 108 illustrated in FIGURES 24 and 26, differing therefrom in that it does not carry any equivalent of the ink pads 112 of the earlier figures but is provided only with depressors 113a. The entire deflector structure may be vertically shifted and pivotally swung by mechanism similar to that shown in FIGURE 26, the upper pivot 109a, being observed in FIGURE 31.

FIGURE 32 illustrates diagrammatically the general structural arrangement employed for marking loose cords prior to marking tighter cords, and also illustrates that the system is not limited to cords which are running in any specific direction but is operative for cords moving horizontally, vertically or at some angle therebetween. In this latter regard, the illustrated cord array is shown as moving in a horizontal plane and then turning downward over a roller 119 into a descending vertical plane. An ink pad 120 and resiliently deformable depressor 121 are spaced respectively below and above the horizontal run of cords, while an ink pad 122 and deflector 123 are positioned on opposite sides of the vertical run of the cord array. When the depressors 121 and 123 are moved downward and laterally respectively into engagement with the cord array, the looser cords will be first deflected into engagement with the ink pads 120 and 122 respectively so that these loose cords will be those first marked, the tighter cords being successively moved into engagement with the ink pads in accordance with their degrees of relative tightness.

FIGURE 33 illustrates diagrammatically the system for first marking tight cords and then successively looser ones of a cord array independently of whether the cord array is moving horizontally, vertically or at some intermediate angle. As shown in FIGURE 33, the cord array moves first horizontally and then turns vertically downward over the roller 124. An ink pad 125 and deflector 126 are spaced, as a first set, above the horizontal portion of the array, while an ink pad 127 and deflector 128 are spaced, as a second set, laterally on the same side of the vertical run of the cord array, the ink pad and deflector of each set being simultaneously movable toward its adjacent cord array portion, with the deflector and ink pad being relatively so positioned that the array of cords is engaged by the deflector prior to its engagement by the ink pad. Since both deflector and ink pad of each set is movable simultaneously and at the same rate toward the array of cords, the deflector 126 (or 128) will move the looser cords away the approaching ink pad but will not be able to move the tighter cords to the same degree so that it is the tighter cords which will first contact the ink pad 125 (or 127) and which will be therefore first marked, successively looser cords being thereafter marked by continued movement of the ink pad toward the array.

It will be understood that the various mechanisms hereinbefore described for effecting simultaneous operation and adjustment of the cord depressing marking and recording devices are merely exemplary; that various other mechanical arrangements may be employed for selectively effecting conjoint and sequential operation of the essential devices, namely, the tensioning devices described as well as those for depressing, marking and recording cords to determine which are broken and/or which deviate in tension from a predeterminedly established tension; and that the present consists substantially in the construction, location and relative arrangement of the said devices for accomplishing the objectives hereinbefore stated.

Having now described my invention in connection with particularly illustrated embodiments thereof, it will be appreciated that variations and modifications of my invention may now occur from time to time to those persons normally skilled in the art without departing from the essential scope or spirit of my invention, and accordingly it is intended to claim the same broadly as well as specifically as indicated by the appended claims.

What is claimed as new and useful is:

1. Apparatus for detecting abnormally tensioned cords in an array of parallel cords normally moving in a substantially common plane under predeterminedly established uniform tension comprising, in combination, cord-marking means disposed adjacent each cord of the array in non-contacting uniformly spaced relation thereto, cord deflector means also disposed adjacent each cord of the array in uniformly spaced relation thereto, said cord deflector means being formed of resilient material capable of yieldingly engaging the cords of the moving array, means operative to uniformly shift said deflector means into yielding engagement with the several cords of the array to thereby variably displace said cords out of their normal coplanar relation in accordance with variations in tension of the cords from their predeterminedly established tension, and means for rendering said cord-marking means effective to mark discrete cords of the array as the same moves through said apparatus.

2. Apparatus for detecting abnormally tensioned cords in an array of parallel cords normally moving in a substantially common plane under predeterminedly established uniform tension comprising, in combination, cord-marking means disposed adjacent each cord of the array in non-contacting uniformly spaced relation thereto, cord deflector means also disposed adjacent each cord of the array in uniformly spaced relation thereto, said cord deflector means being formed of resilient material capable of yieldingly engaging the cords of the moving array, and means operative to move said deflector means into yielding engagement with the cord array to variably shift the several cords thereof out of their normal plane in accordance with deviations in tension of the cords from their normal predetermined tension and thereby cause certain of the cords to contact and be marked by said marking means as the cord array moves through the apparatus.

3. Apparatus for detecting out of plane cords in an array of cords moving under predetermined normal tension in parallel relation in a substantially common plane, comprising in combination, cord marking means positioned adjacent to each cord of said array in noncontacting uniformly spaced relation from the said normal common plane of said cord array, cord array yieldable deflector means positioned adjacent to each cord of said array in noncontacting uniformly spaced relation from the said normal common plane of said array, and means operative to move said deflector means uniformly toward and beyond the said cord array common plane to engage the cords of the array and cause said cords and said cord marking means to move relatively to one another and come into contact in accordance with the tension of each cord of said array.

4. Apparatus for detecting out of plane cords in an array of moving cords normally disposed in parallel relation in a substantially common plane, comprising in combination, cord marking means positioned adjacent to each cord of said array in noncontacting uniformly spaced relation from the said normal common plane of said cord array, cord array yieldable deflector means positioned adjacent to each cord of said array in noncontacting uniformly spaced relation from the said normal common plane of said cord array, shift means coupled to said deflector means operative when actuated to move said deflector means uniformly toward and beyond the said cord array common plane to engage the cords of the array and cause said cords and said cord marking means to move relatively to one another and come into contact in accordance with the tension of each cord of said array, said cord marking means and said deflector means being both positioned on the same side of said cord array common plane and said marking means being provided with shift means operative to move the same uniformly toward and beyond the said cord array common plane, said deflector means shift means being operative to move said deflector means to said cord array common plane before said marking means shift means moves said marking means thereto, whereby relatively looser cords in the array are initially deflected by said yieldable deflector means and the tighter cords are first marked by said marking means.

5. The apparatus as set forth in claim 4 wherein said deflector means shift means and said marking means shift means are fixedly interlocked and operated by a common drive means.

6. The apparatus as set forth in claim 4 wherein said marking means shift means and said deflector means shift means are a common rigid carrier member operated by a single drive means.

7. The apparatus as set forth in claim 4 wherein said marking means shift means and said deflector means shift means are a common rigid carrier member operated by a single drive means, said carrier member being provided with pivotal supports effective to permit pivotal movement of said carrier member about an axis orthogonal to the said cord array common plane.

8. The apparatus as set forth in claim 4 wherein said deflector means comprises resiliently compressible pad means.

9. The apparatus as set forth in claim 4 further including recording means positioned adjacent to each cord of said array in noncontacting uniformly spaced relation from the said normal common plane of said cord array on the opposite side of said cord array common plane from said deflector means and on the downstream side of said marking means, said recording means being spaced from said cords so that any cords engaged and marked by said marking means are moved into contact with said recording means to thereby record the position in the cord array of the marked cords.

10. The apparatus as set forth in claim 9 wherein said marking means shift means includes a rigid carrier member and said recording means and marking means are secured to and carried by said carrier member.

11. The apparatus as set forth in claim 9 further including recording means shifting means operative when actuated to change the position of said recording means to render the recorded data visible in a plane intersected by the lines of cord movement rather than parallel thereto.

12. Apparatus for detecting out of plane cords in an array of moving cords normally disposed in parallel relation in a substantially common plane, comprising in combination, cord marking means positioned adjacent to each cord of said array in noncontacting uniformly spaced relation from the said normal common plane of said cord array, cord yieldable deflector means positioned adjacent to each cord of said array in noncontacting uniformly spaced relation from the said normal common plane of said array, shift means coupled to said deflector means operative when actuated to move said deflector means uniformly toward and beyond the said cord array common plane to engage the cords of the array and cause said cords and said cord marking means to move relative to and effect contact with one another in accordance with the tension of each cord of said array, said cord marking means and said deflector means being positioned on opposite sides of said cord array common plane and said deflector means shift means being operative to move said deflector means against the cords of said array to shift the latter against said marking means, whereby cords in the array are deflected against said marking means in accordance with their degree of tension with the looser cords being first marked and the tighter cords last marked.

13. The apparatus as set forth in claim 12 wherein said deflector means comprises resiliently compressible pad means.

14. The apparatus as set forth in claim 12 wherein said deflector means shift means includes a carrier member provided with pivotal supports effective to permit pivotal movement of said carrier member and deflector means about an axis orthogonal to the said cord array common plane.

15. The apparatus as set forth in claim 12 further including recording means positioned adjacent to each cord of said array in noncontacting uniformly spaced relation from the said normal common plane of said cord array on the opposite side of said cord array plane from said deflector means and on the downstream side of said marking means, said recording means being spaced from said cords so that any cords engaged and marked by said marking means are moved into contact with said recording means to thereby record the position in the cord array of the marked cords.

16. The apparatus as set forth in claim 15 further including recording means shifting means operative when actuated to change the position of said recording means to render the recorded data visible in a plane intersected by the lines of cord movement rather than parallel thereto.

17. Apparatus for detecting out of plane cords in an array of moving cords normally disposed in parallel relation in a substantially common plane, comprising in combination, first and second cord marking means each positioned adjacent to each cord of said array in noncontacting uniformly spaced relation from and on opposite sides of the said normal common plane of said cord array, cord array yieldable deflector means positioned adjacent to each cord of said array in noncontacting uniformly spaced relation from the said normal common plane of said cord array, shift means coupled to said deflector means operative when actuated to move said deflector means uniformly toward and beyond the said cord array common plane to engage the cords of the array and cause said cords to move relatively to said cord marking means and come into contact with the latter in accordance with the tension of each cord of said array.

18. Apparatus for detecting out of plane cords in an array of moving cords normally disposed in parallel relation in a substantially common plane, comprising in combination first and second cord marking means each positioned adjacent to each cord of said array in noncontacting uniformly spaced relation from and on opposite sides of the said normal common plane of said cord array, first and second cord array yieldable deflector means positioned adjacent to each cord of said array in noncontacting uniformly spaced relation from and on the same side of the said normal common plane of said cord array as said first marking means, first and second shift means coupled respectively to said first and second deflector means operative when actuated to independently move the associated deflector means uniformly toward and beyond the said cord array common plane to engage the cords of the array and cause said cords to move relative to said cord marking means and come into contact with the latter in accordance with the tension of each cord of said array, first marking means shift means operative to move said first marking means uniformly toward and beyond the said cord array common plane, said first deflector means shift means being operative simultaneously with said first marking means shift means to move said first deflector means to said cord array common plane before said first marking means thereto, whereby relatively looser cords in the array are initially deflected by said first deflector means away from said first marking means and the tighter cords are first marked by said first marking means, and said second deflector means shift means being operative when actuated to move said second deflector means against the cords of said array to shift the latter against said second marking means, whereby relatively looser cords in the array are initially deflected by said second deflector means against said second marking means and the tighter cords are last marked by said second marking means.

19. The apparatus as set forth in claim 18 wherein said first deflector means shift means and said first marking means shift means are a common rigid carrier member operated by a single drive means.

20. The apparatus as set forth in claim 18 wherein said first deflector means and said first and second marking means are all fixedly positioned relative to one another on a common rigid carrier member, and said carrier member comprises the said first deflector means shift means and first marking means shift means.

21. The apparatus as set forth in claim 18 further including recording means positioned adjacent to each cord of said array in noncontacting uniformly spaced relation from the said normal common plane of said cord array on the opposite side of said cord array plane from said deflector means and on the downstream side of said marking means, said recording means being spaced from said cords so that any cords engaged and marked by said marking means are moved into contact with said recording means to thereby record the position in the cord array of the marked cords.

References Cited

UNITED STATES PATENTS 2,542,097  2/1951  Shaffer et al. _____ 242—131.1
3,181,354  5/1965  Cashore _____ 73—159

DAVID SCHONBERG, *Primary Examiner*.